United States Patent [19]
Merlot et al.

[11] Patent Number: 5,080,423
[45] Date of Patent: * Jan. 14, 1992

[54] SEGMENTED COVER SYSTEM

[75] Inventors: Vincent J. Merlot; James R. Nanci, both of Pittsburgh, Pa.

[73] Assignee: Sundance, Inc., Pittsburgh, Pa.

[*] Notice: The portion of the term of this patent subsequent to Jun. 25, 2008 has been disclaimed.

[21] Appl. No.: 719,835

[22] Filed: Jun. 24, 1991

Related U.S. Application Data

[63] Continuation of Ser. No. 414,193, Sep. 28, 1989, Pat. No. 5,026,109.

[51] Int. Cl.$^5$ ............................................. B60D 25/06
[52] U.S. Cl. .................................... 296/105; 296/118; 296/100; 160/84.1
[58] Field of Search ................. 296/100, 98, 104, 105, 296/118; 160/84.1, 392, 395

[56] References Cited

U.S. PATENT DOCUMENTS

| | | | |
|---|---|---|---|
| 2,469,958 | 5/1949 | Fowler | 296/105 |
| 2,950,727 | 8/1960 | Dunn | 160/392 X |
| 3,720,438 | 3/1973 | Johnson et al. | 296/163 |
| 3,875,623 | 8/1975 | Johnston | 160/392 X |
| 3,979,782 | 9/1976 | Lamb | 296/100 X |
| 4,189,178 | 2/1980 | Cramaro | 296/100 X |
| 4,328,853 | 5/1982 | Gall et al. | 160/84.1 X |
| 4,747,441 | 5/1988 | Apolzer et al. | 296/100 X |
| 4,801,171 | 1/1989 | Weaver | 296/105 X |
| 4,854,630 | 8/1989 | Biancale | 296/100 |
| 5,026,109 | 6/1991 | Merlot, Jr. | 296/105 |

FOREIGN PATENT DOCUMENTS 2519365 11/1976 Fed. Rep. of Germany ...... 160/392

Primary Examiner—Johnny D. Cherry
Assistant Examiner—Joseph D. Pape
Attorney, Agent, or Firm—Reed, Smith, Shaw & McClay

[57] ABSTRACT

The present invention provides a segmented cover system utilizing a series of cover sections, which can be of any size and shape, and a series of curved or straight supporting bows to form a cover assembly which allows for the easy replacement of a cover section or a bow without disassembling the entire cover system. The present cover assembly preferably utilizes a series of standard cover sections which are detachably secured to the two adjacent supporting bows. Preferably, the supporting bows are curved and consist of a bow center section and two easily removable bow end sections. The unique design, construction and interaction of the cover sections, the bow center sections and the bow ends enable damaged cover sections and bows to easily be removed and replaced without disassembling or removing the cover system from its location. A drive assembly can be used to extend and retract the segmented cover system of the present invention.

14 Claims, 3 Drawing Sheets

SEGMENTED COVER SYSTEM

This is a continuation of copending application Ser. No. 07/414,193 filed on Sept. 28, 1989, now U.S. Pat. No. 5,026,109.

FIELD OF THE INVENTION

The present invention relates to a segmented cover system for covering a large area and more particularly to a retractable segmented covering system for covering the top of truck and trailer bodies.

BACKGROUND OF THE INVENTION

The need for a reliable covering system and particularly a retractable covering system for truck and trailer bodies has long been recognized where the cargo being carried is perishable, a hazardous material, or which could be dangerous to passing motorists such as stones, gravel, asphalt, shale, or any other material which can become a projectile. Moreover, many states are passing laws which mandate the use of covering systems on trucks and trailers. Retractable covering systems have the advantage that they can be operated easily and safely from the ground by one person. They also can be extended and retracted in very little time thereby improving overall efficiency and reducing driver fatigue.

U.S. Pat. Nos. 4,801,171, 4,725,090 and 4,189,178 describe several different truck tarpaulin covering systems which allow a tarpaulin cover to be mechanically extended or retracted from the top portion of a truck trailer. While these retractable cover systems can accomplish their intended purpose once they are installed, they typically require a significant amount of time and effort to install, especially since they are not easily installed by one person. Thus, they are not interchangeable.

Moreover, these systems have a serious drawback if the tarpaulin or its supports become damaged, either during normal operation or during covering and uncovering of the trailer body. It is very difficult to repair or replace these systems if they become damaged and therefore the entire truck can be out of operation for a long period of time until the cover system is completely repaired or replaced. This is because, to replace the cover or the supporting rods, the cables which enable the cover system to be retractable have to be disconnected from all of the supporting bows and these in turn must be disconnected individually from the entire tarp. If a spare tarp is not immediately available, the entire tarp must be sent out for repair even if the damaged area comprises only a small portion of the tarp. Additional delays can occur in repairing the tarp, itself. Even after the tarp is repaired, the whole cover system must be reassembled and reinstalled on the truck trailer, again requiring a significant amount of time and manual labor.

The entire removal and installation process is quite involved and very labor intensive because these tarps can be quite big (typically 10–48 ft. long) and on average are about 34 ft. long and 8-10 ft. wide. In most of these systems, a sleeve is required to be made in the tarp (typically about every 3 ft.) into which each one of the supporting rods must be inserted. This construction results in a very expensive tarp due to the amount of detailed work involved in creating all these pockets. Moreover, it is very tedious and time consuming to insert all of the supporting bows into the tarp pockets as in U.S. Pat. No. 4,189,178 or to connect the tarp to each of the supporting rods as in U.S. Pat. Nos. 4,801,171 and 4,725,090. It is also difficult, due to its weight and bulk, to put the combined tarp and supporting rod assembly onto the truck trailer. Thereafter, the cables by which the cover is extended or retracted must be individually connected to each supporting rod by feeding it through an opening in the end thereof. As a result of this expensive and involved process, many trucks operate with damaged tarps and supporting rods because it is easier and cheaper to use damaged equipment than to incur the time and expense necessary to fix it. However, using damaged tarps permits material to be blown from the truck trailers and allows water damage to the cargo, thereby defeating the purpose of the truck cover system and possibly being a violation of law.

Due to the frequency with which these tarpaulin covering systems become damaged it would be desirable to have a retractable cover system wherein only the damaged portion could easily be removed and replaced without replacing or disassembling the entire cover system. Similarly, such a cover system would be desirable in certain application, even if it were not retractable.

SUMMARY OF THE INVENTION

Generally, the present invention provides a cover system comprising a plurality of cover sections with a plurality of parallel supporting bows spaced therebetween to form a cover assembly wherein the cover section is detachably connected between successive supporting bows such that the cover section can be removed from the cover system independent of the other cover sections. The cover system of the present invention can be used in almost any industrial, commercial, residential or recreational setting wherein it is desired to have a cover for a large area. It also could be used for small areas, but it is particularly useful for large areas. With the addition of a drive assembly and a frame, the cover assembly can be made retractable thereby expanding its possible uses to almost any structure or container. For example, the present cover system could be used as an awning over a porch or patio, or as a cover for a swimming pool. Preferably, however, the present invention is used as a cover system for large vehicles such as railroad cars and truck and trailer bodies.

One embodiment of the present invention provides a retractable segmented cover system comprising a drive assembly, a plurality of uniquely designed parallel supporting rods or bows and a plurality of cover sections or tarp segments, each one connected between two successive supporting bows to form a cover assembly. Depending on the size of the area to be covered, the present invention uses a varying number of cover sections, which can be of different shapes and sizes, and a varying number of supporting bows. The cover sections extend at least to the edge of the frame and preferably beyond to fully cover the area. One advantage of the present invention is that each bow can be of the same standard design and shape and preferably, each cover section can be of the same standard size and shape. This greatly reduces manufacturing and inventory costs.

The cover sections can be made of any flexible material typically used in cover systems such as canvas, nylon or plastic. It can also be waterproof or porous, continuous or mesh, depending on the particular application for which it is used. Each supporting bow is comprised of a curved or straight bow center section and two mating bow end sections (bow ends). The cover sections are easily interchangeable since they are detachably connected between each successive supporting bow center section. The bow end sections keep the cover sections in place and also form a guidepath for the drive assembly. The bow ends can be made as a single unit, in which case they are permanently attached to the drive assembly or, preferably, they can be made as two pieces which enables them to be easily connected to or disconnected from the drive assembly.

By the removal of a fastening means which fixedly connects the bow end to the bow center section, each bow end can be removed from mating engagement with its corresponding bow center section and also from connection with the cable of the drive assembly. When two successive bow ends are removed, the cover section therebetween can easily be detached from the adjacent bow center sections by sliding it out. Then, another cover section can be installed. Once the cover section has been replaced, the bow ends can easily be reconnected to the drive assembly and their corresponding bow center sections due to their mating configurations. Then, the fastening means can be reinstalled to firmly connect each bow end to the corresponding bow center section, thereby holding the replacement cover section in place. In a similar manner, a damaged bow can easily be replaced by removing both of its bow ends and sliding it out from between the adjacent cover sections.

A drive assembly can be used to extend and retract the segmented cover assembly consisting of the alternating cover sections and supporting bows. Any number of known mechanical or electrical drive systems can be used. Preferably, the drive assembly comprises an endless cable and two pulleys on each side of the cover assembly with a pulley on each side connected together by a rod. The last supporting bow (i.e. the one closest to the back of the frame or truck trailer) is fixedly attached at each end thereof to the cable on each side of the cover assembly so that as the cable moves it pulls the rest of the bows due to the interconnection of the cover sections and the bows. Preferably, each cable passes through a hole in each of the bow ends of the remaining bows on one side of the cover assembly. Due to the construction of the bow ends, it is very easy to attach or disconnect them from the cable and they do not require the cable to be threaded therethrough which would be impossible with an endless cable. The drive assembly can be either manually operated or motor driven.

Other details, objects and advantages of the present invention will become more readily apparent from the following description of the presently preferred embodiment thereof.

BRIEF DESCRIPTION OF THE DRAWINGS

In the accompanying drawings, a preferred embodiment of the present invention is illustrated, by way of example only wherein.

DESCRIPTION OF THE PREFERRED EMBODIMENT

Figure 1:
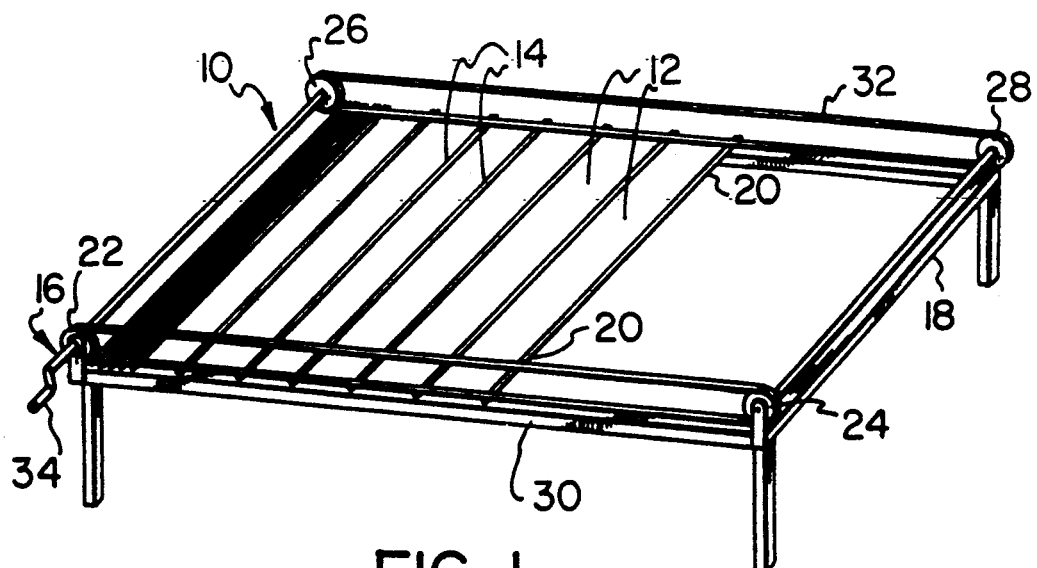
FIG. 1 is a perspective view of a retractable segmented cover system and frame.

FIG. 1 shows a retractable segmented cover system 10 of the present invention utilizing a plurality of cover sections 12 interspersed between supporting rods 14 and a drive assembly 16 connected to at least one supporting rod 14 for extending and retracting the cover sections 12. In this particular embodiment, a rectangular frame 18 is used to support the ends 20 of the supporting rods 14 and the drive assembly 16, although any size or shape of frame could be used depending upon the size and shape of the area to be covered. The cover sections 12 extend at least as far as the frame 18 and preferably beyond. The supporting rods 14 are straight, although as shown in the other Figures, they may be curved or formed in any other desired shape. The segmented cover system 10 and frame 18 can be placed over any area where it is desired to have a retractable cover system. For example, the frame 18 may be placed over or be part of a porch or a swimming pool with the retractable segmented cover system 10 operating on the frame 18. The drive assembly 16 is fairly straight forward and is similar to those described in the patents mentioned above. In one embodiment, the drive assembly 16 consists of two pairs of pulleys 22,24 and 26,28 with an endless cable 30 and 32, respectively connected between each pair of pulleys. Pulleys 22 and 26 are drivingly connected by a rod. One of the pulleys 22 has a handle 34 connected to it by means of which it can be turned to extend or retract the cover system 10.

Figure 2:
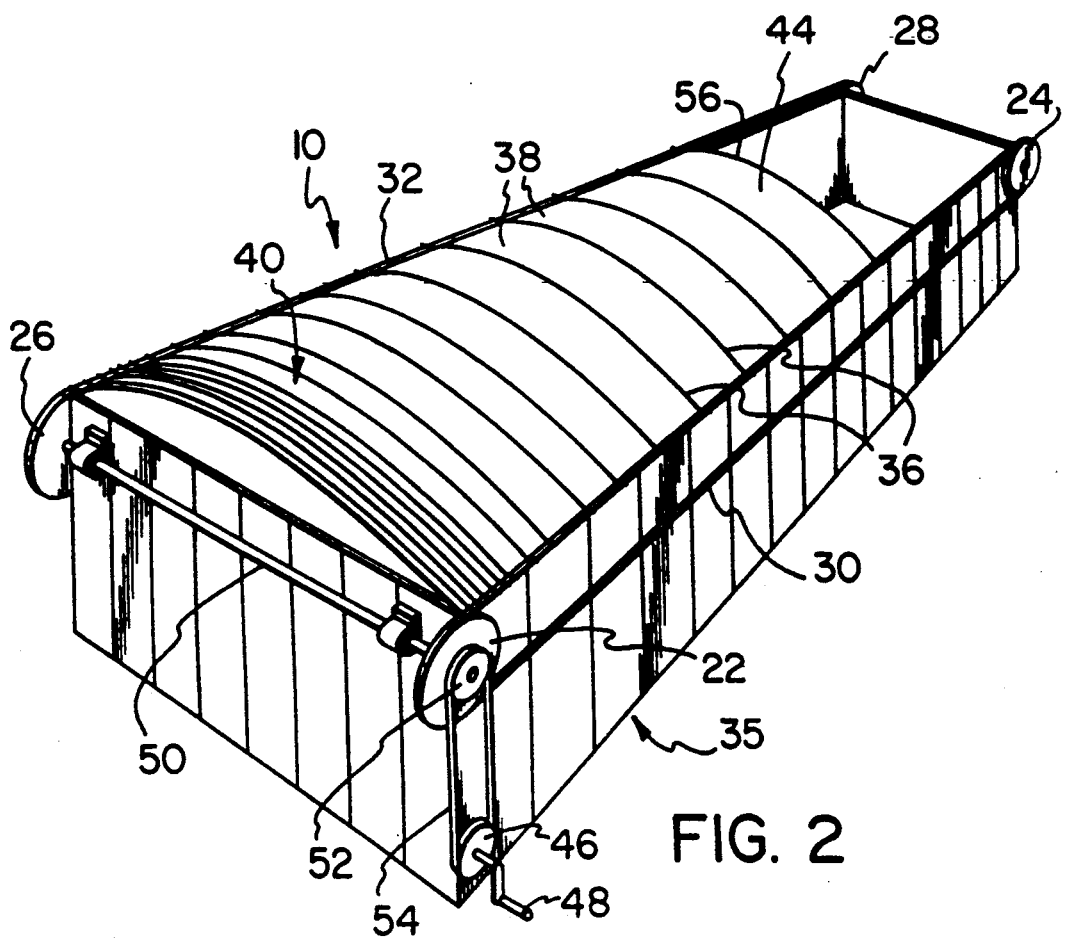
FIG. 2 is a perspective view of a retractable segmented cover system placed on a truck trailer.

As shown in FIG. 2, the segmented cover system 10 of the present invention is particularly useful for the top of truck trailer bodies 35 or even railroad cars. The embodiment shown in FIG. 2 utilizes a series of curved bows 36 to support and connect the series of tarp segments 38 thereby preventing water from collecting on the cover assembly 40 and also enabling the cover assembly 40 to clear heaped loads. Preferably, the cover system 10 is comprised of a series of tarp segments 38 of a standard, uniform size each connected to and placed between two curved bows 36. The number of curved bows 36 and the number of tarp segments 38 used in the cover system. 10 can easily be adjusted depending upon the length of the truck trailer to be covered. If the length of the vehicle does not correspond to a multiple of the standard size of the tarp segments 38, an adjustment can easily be made at either end of the cover assembly 40 by taking up the slack in either the first 42 or last 44 tarp segment.

The drive assembly shown in FIG. 2 comprises two pairs of pulleys 22,24 and 26,28 on each side of the truck trailer body 35 at the top and a third pulley 46 near the base of the trailer body 35 so that the cranking handle 48 can be located in a convenient position for the operator. Again, as in FIG. 1, each pair of pulleys one at the front end and one at the back end on a side of the truck are connected together by endless cables 30,32, respectively. The pulleys at the front end of the truck trailer are connected together by a rod 50 which enables the pulleys at the front to rotate at the same speed and enables one cranking handle 48 to extend and retract the entire cover system 10. A fourth pulley 52 is mounted on pulley 22 of the first pair and is connected by a third cable 54 to the third pulley 46 to which the cranking handle 48 is connected. By turning the cranking handle 48, the cable 54 connecting the third 46 and fourth 52 pulleys moves, causing the fourth pulley 52 to rotate and since it is fixedly mounted to pulley 22 of the first pair of pulleys, it causes pulley 22 to turn which in turn causes the cable 30 along the top side of the truck trailer body 35 to move. Since the last bow 56 is fixedly connected at each end to each cable 30 and 32, movement of the cables in one direction extends the cover assembly 40 and movement of the cables in the opposite direction retracts the cover assembly 40.

Figure 3:
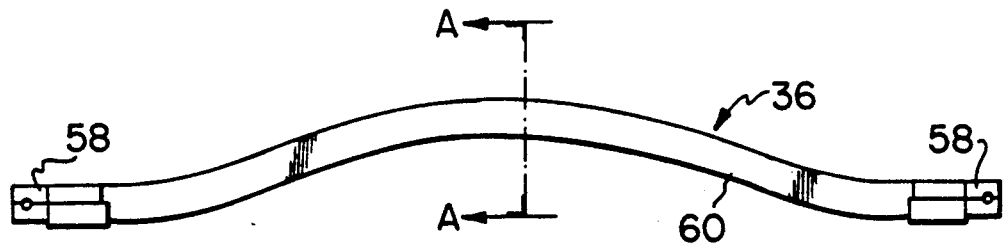
FIG. 3 is a side view of one of the curved supporting bows used in a segmented cover system.
Figures 4, 5:
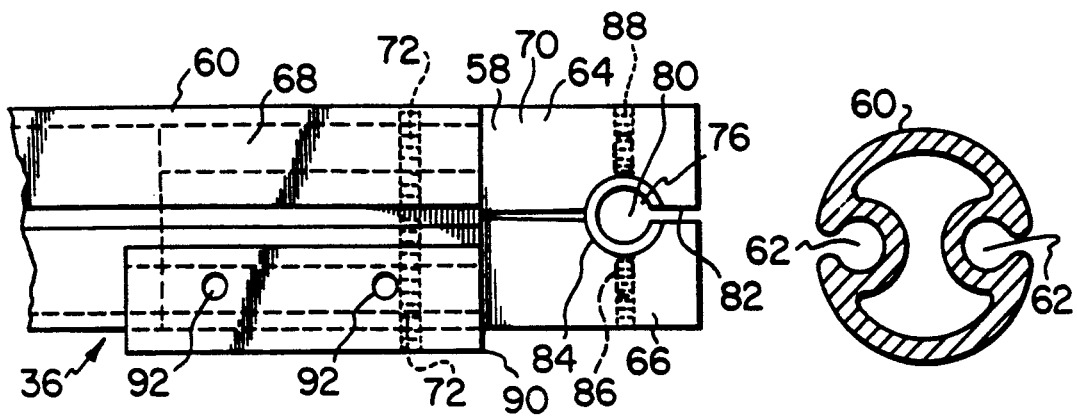
FIG. 4 is an enlarged view of an end section of the supporting bow shown in FIG. 3.
FIG. 5 is an cross-sectional view of the center section of the supporting bow shown in FIG. 3 taken along line A—A.

FIG. 3 shows a preferred embodiment of a curved supporting bow 36. Preferably, it is comprised of two bow ends 58 and a bow center section 60. The bow center section 60 is preferably made from a piece of extruded aluminum thereby forming a corrosion-proof foundation for the tarp segments 38 of the cover assembly 40. Various other materials can be used to form the bow center section 60 including steel and plastic. The preferred cross-sectional configuration of the bow center section 60 is shown in FIG. 5, where the round shape provides for increased strength. The generally circular cavities or grooves 62 in the bow center section 60 are parallel and extend along its length on opposite sides and receive and hold an edge of each tarp segment 38 while allowing the cover segment 38 to extend out of the slit but not permitting it to be detached from the bow center section 60. The bow center section 60 of the curved bow 36 can be formed into numerous different shapes and configurations depending upon the particular application.

Figures 6, 7:
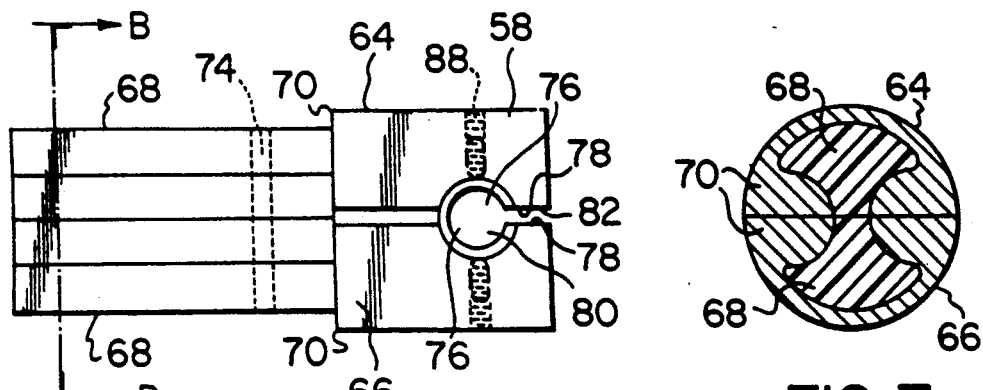
FIG. 6 is a an enlarged view of the bow end of the supporting bow shown in FIG. 4.
FIG. 7 is an end view of the bow end shown in FIG. 6 taken along line B—B.

FIG. 4 shows a close-up of the mated connection between the bow end 58 and the bow center section 60 of the curved bow 36 while FIG. 6 shows the bow end 58 of FIG. 4 when removed from engagement with the bow center section 60. Preferably, the bow end 58 as shown in FIG. 6 is comprised of a separate top part 64 and bottom part 66 although it may be made as a single piece. Having the bow end 58 made from two separate parts is preferable since the top and bottom parts 64 and 66 are identical to each other and can be made very economically using the same mold. The bow ends 58 are preferably made from a high strength durable material such as polyurethane, although plastics, elastomers or other suitable materials can be used.

As shown in FIG. 6, both the top 64 part and the bottom part 66 of the bow end 58 have an extended first portion 68 which can slide into and mate with the end of the bow center section 60, and a semicircular second portion 70 which is adjacent to the end of the bow center section 60 when the bow end 58 is inserted into the bow center section 60. When both top and bottom parts 64 and 66 of the bow end 58 are inserted into the end of the bow center section 60, a fastening means such as pin 72 can be inserted through a hole 74 to thereby fixedly connect the bow and 58 to the bow center section 60. A semicircular groove 76 can be cut in the flat surface 78 of the second portion 70 of the top and bottom parts 64 and 66 to form a generally circular opening 80 when the top and bottom parts 64 and 66 of the bow end 58 are inserted into the end of bow center section 60. The grooves 76 are aligned to form an opening 80 through which the cable 30 or 32 of the drive assembly 16 can pass unobstructed. A channel 82 connects this circular opening 80 to an exterior surface of the bow end 58 to permit the removal of debris from opening 80 which may become lodged therein due to the cable 30 or 32 passing therethrough. Preferably, a durable cable guide 84 is mounted in the groove 76 to prevent wear of the polyurethane material of the bow end 58. This cable guide 84 can be held in place by another screw or pin 86 inserted in a hole 88. Alternatively, a pin could be inserted tangent to the groove 62 between the opening 80 and the end of the bow end 58 to prevent the cable 30 or 32 from wearing its way out of the opening 80.

The bow end 58 can be easily inserted into the bow center section 60, as shown in FIG. 4. The end of the bow center section 60 has a curved wear guard 90 attached to its underside and held in place by several screws 92. This wear guard prevents destruction of the ends of the bow center section 60 from the sliding friction with the frame as the end of the bow center section 60 slides along the frame when it is extended or retracted. Preferably, the wear guard 90 is made of a material such as nylon or teflon to reduce and minimize friction and forms an arc of approximately 120° to match the curve of the bow center section 90. In one embodiment, the wear guard 90 can be formed integrally with bow bottom part 66 thereby forming a groove into which the end of bow center section 60 is inserted. A wear guard 90 can also be used on the top of the end of bow center section 60, especially if the frame forms a top and bottom guide with the bow end 58 passing therebetween.

Figure 8:
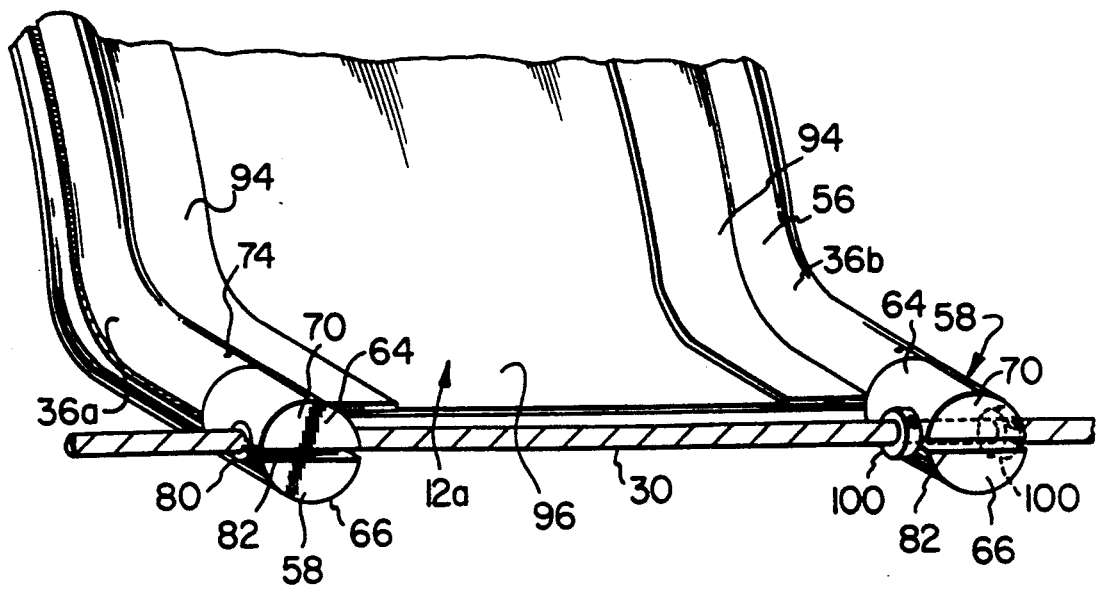
FIG. 8 is an enlarged perspective view showing the interconnection of a cover section, the neighboring supporting bows and the cable of the drive assembly.
Figure 9:
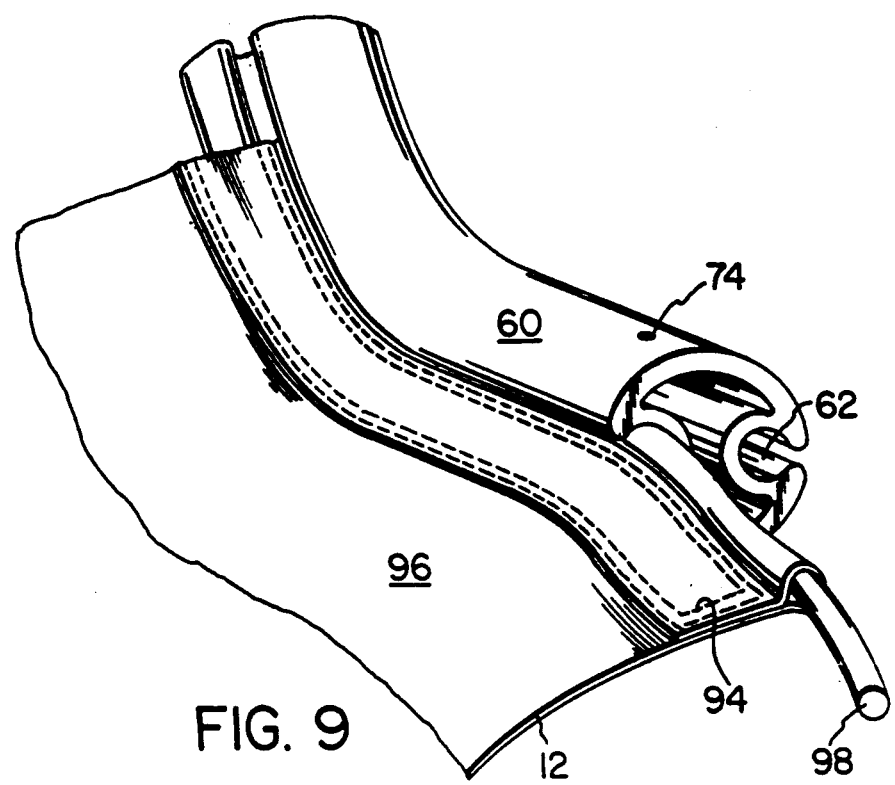
FIG. 9 is a perspective view showing a cover section being removed from the adjacent bow center section.

FIG. 8 shows a close-up of one cover section 12a between two adjacent curved bows 36a and 36b. As can be seen in FIG. 9, the cover section 12 preferably has two edges 94 along its sides which are 5 thicker than the center 96 of the cover section 12a in FIG. 8. This can be easily achieved by folding a portion of the edge over a round flexible material 98 and hemming it with the material 98 remaining inside. This prevents the cover section 12a from pulling out of the groove 62 of the bow center section 60 once it has been inserted in the groove 62 shown in FIG. 9. The cable 30 is not fixed to the bow end 58 but slides freely through the opening 80 therein except for the last bow 56 which is fixedly attached to the cable 30. Alternatively, a flange 100 can be attached to the cable 30 on each side of the last bow 56 such that it impacts the bow end of the last bow 56 and pushes it since it is too large to fit through the opening 80. The remaining bow ends 58 do not need this flange 100 as the cover sections 12 will pull them along and either extend or retract them depending on the direction of movement the cables 30 and 32.

If one or two sections of the cover system 10 are damaged, one only needs to remove the fastening pin 72 in the bow ends 58 at one end of the curved bows 36a and 36b on either side of the damaged cover section 12. These bow ends 58 are then removed from the center sections 60 of the bows 36a and 36b. The cover section 12a can then easily be slid out of the groove 62 in the aluminum extrusion which forms the bow center section 60 and a replacement cover section 12 can be slid into place. The bow ends 58 are then reconnected to the corresponding bow center sections 60 and the fastening pins 72 are reinserted. With this simple procedure, the damaged cover section 12a can easily be removed and the cover assembly 40 has been repaired without its entire removal. This same procedure can be used if one desires to replace certain cover sections of one type (i.e. waterproof) with cover sections of another type (i.e. mesh) to form a mixed cover assembly.

If instead, a bow 36 is damaged, the same procedure can be used to remove the damaged bow. In this case, however, both the bow ends 58 from the damaged bow 36 would be removed so that the damaged bow 36 could be slid out from between the adjacent cover sections 12. A new bow center section 60 could then be slid into place and the undamaged bow ends 58 can be connected to the new bow center section 60 to form the complete bow 14.

While a presently preferred embodiment of practicing the invention has been shown and described with particularity in connection with the accompanying drawings, the invention may otherwise be embodied within the scope of the following claims.

What is claimed is:

1. A retractable segmented cover system used with a frame comprising a plurality of flexible cover sections with a plurality of substantially parallel supporting bows spaced therebetween and a drive assembly, wherein each cover section is detachably connected between a pair of the substantially parallel supporting bows, the bows being slideably supported on the frame and at least one bow being fixedly connected to the drive assembly such that the cover system can be extended or retracted by the drive assembly and wherein a cover section can be removed from the cover system independent of the other cover sections.

2. The segmented cover system as described in claim 1 wherein the supporting bows are curved.

3. The segmented cover system as described in claim 1 wherein the drive assembly comprises at least on endless cable and two pairs of pulleys, one pair located on each of two opposite sides of the cover system such that one pulley is mounted adjacent each corner of the frame and the pulleys at a front end of the frame are connected together by a rod; each endless cable being fixedly connected to at least one supporting bow and slideably passing through the other supporting bows.

4. The segmented cover system as described in claim 1 wherein at least one of the supporting bows comprises a bow center section, having a groove along each side substantially parallel to one another, and two bow ends each being detachably connected to an end of the bow center section by a fastening means.

5. The segmented cover system as described in claim 4 wherein the bow ends are detachable from the corresponding bow center sections of the substantially parallel supporting bows thereby enabling the cover section therebetween to be detached from the bow center sections.

6. The segmented cover system as described in claim 5 wherein the bow ends are comprised of a top part and a bottom part which are matingly connected to the bow center section.

7. The segmented cover system as described in claim 6 wherein the top and bottom parts have a groove therein, running perpendicular to the grooves in the bow center section, such that when the top and bottom parts are connected to the bow center section the grooves therein are aligned and form an opening in the bow end through which a cable of the drive assembly can pass.

8. The segmented cover system as described in claim 7 wherein at least two edges of the cover sections are thicker than the center thereof.

9. The segmented cover system as described in claim 8 wherein the thicker edges can be inserted into the grooves of the supporting bows.

10. The segmented cover system as described in claim 4 wherein the grooves in the bow center section are generally circular.

11. The segmented cover system as described in claim 7 wherein an open channel connects the opening in the bow end with an exterior surface of the bow end.

12. The segmented cover system as described in claim 11 further comprising a cable guide fixedly set in the grooves of the bow end to prevent wear from the cable.

13. The segmented cover system as described in claim 1 further comprising a wear guard attached to the bow near the bow end to reduce friction between the bow and the frame.

14. A segmented cover system comprising a plurality of flexible cover sections with a plurality of substantially parallel supporting bows spaced therebetween wherein each cover section is detachably connected between a pair of the substantially parallel supporting bows such that the cover section can be removed from the cover system independent of the other cover sections.

* * * * *